June 6, 1944.  T. P. SIMPSON ET AL  2,350,644
APPARATUS FOR CATALYTIC CONVERSION
Filed Oct. 28, 1942
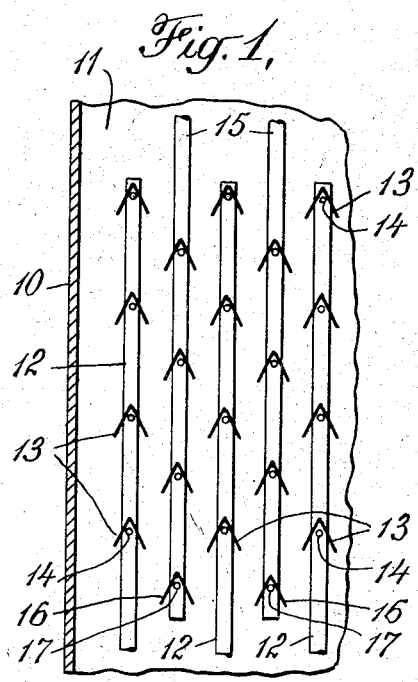
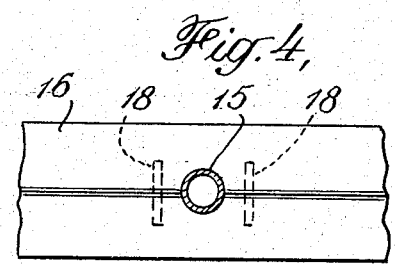
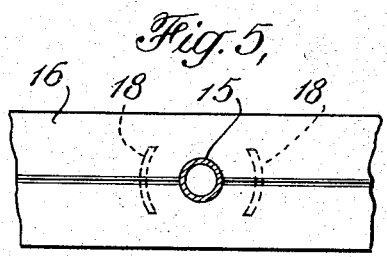
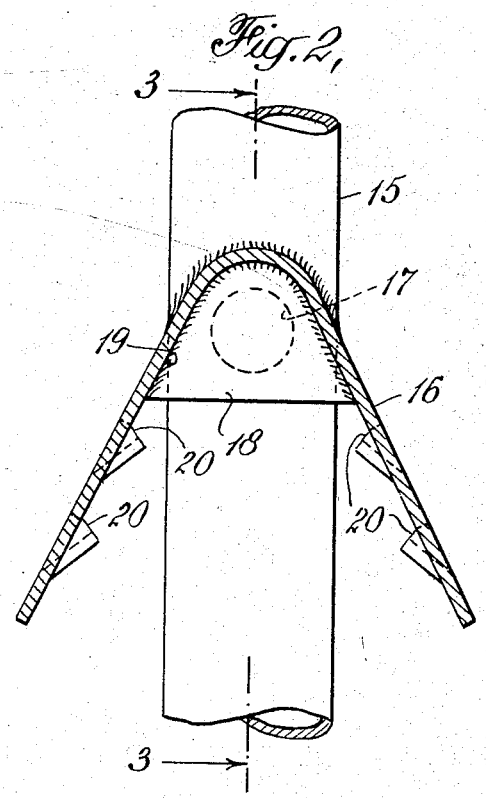
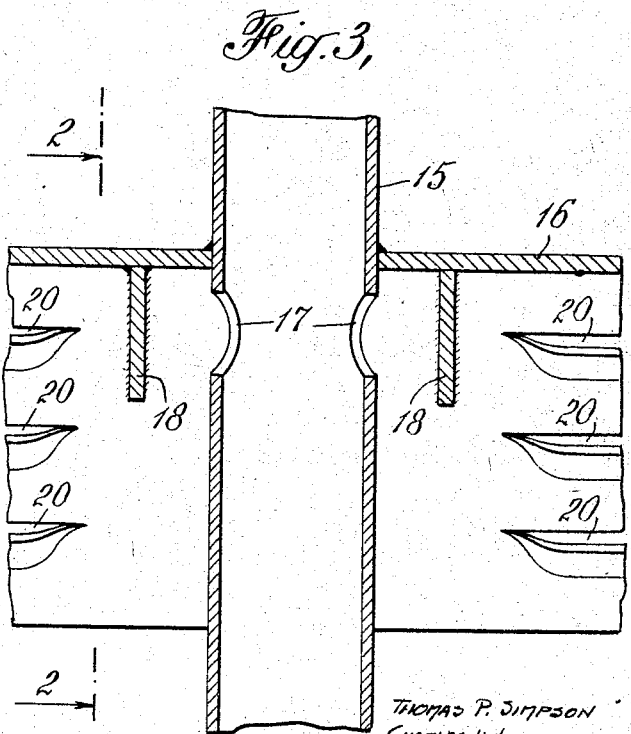
THOMAS P. SIMPSON
CHARLES H. LECHTHALER
INVENTORS
BY
ATTORNEY Patented June 6, 1944

2,350,644

UNITED STATES PATENT OFFICE 2,350,644

APPARATUS FOR CATALYTIC CONVERSION

Thomas P. Simpson and Charles H. Lechthaler, Woodbury, N. J., assignors to Socony-Vacuum Oil Company, Incorporated, a corporation of New York Application October 28, 1942, Serial No. 463,606

2 Claims. (Cl. 23—288)

This invention has to do with apparatus for the catalytic conversion of hydrocarbons and the like in the presence of a contact mass and has particularly to do with such processes wherein the hydrocarbons in vapor phase and at conversion temperatures are brought into contact with a moving column of particle form solid adsorptive catalytic material.

In such processes the reactants are distributed within the contact mass and collected therefrom by certain void-passage creating means, and this invention has particularly to do with devices of this sort.

In order to understand this setting in which this invention will operate and the invention itself, reference is now made to the drawing attached hereto, where Figure 1 shows, in highly diagrammatic form, a rudimentary type of reactor and Figures 2, 3, 4 and 5 show views of the particular device which is the subject of this invention. In Figure 1 there is shown a portion of a reactor which is encased by sidewall 10 and is wholly filled with a downwardly flowing solid column of particle-form solid adsorptive catalytic material 11. Within this column of moving catalyst particles there is a series of distributor tubes 12, each communicating at their lower end with a reactant supply not shown, and closed at their upper end. Spaced along each tube 12 there is a series of inverted troughs 13, 13, 13, extending transversely through the catalyst bed in a plane perpendicular to the plane of the drawing and under each trough, in each tube 12, there is an orifice 14. A second similar series of collector tubes 15 opening at the top to a reactant outlet is arranged alternately with tubes 12 and these collector tubes are equipped with troughs 16 and orifices 17. As shown in the Figures 2 and 3, the troughs are provided with increased communication between the space under the trough and the surrounding contact mass by a plurality of slots 20. In operation, reactants flow through distributor tubes 12, through orifices 14 into the spaces under distributor troughs 13, from those spaces into the contact mass, from the contact mass into the spaces under collector troughs 16, through orifices 17 into collector tubes 15 and so out of the reactor. A more detailed description and discussion of such reactors will be found in application Serial No. 447,432, filed June 17, 1942.

This invention has particularly to do with the interior construction of the collector troughs in the above described apparatus and may be understood more readily by reference to Figures 2 and 3, wherein, as before, 15 is a collector tube, 16 a collector trough and 17 is the orifice communicating between the interior of the collector tube and the space under the trough. In order to prevent entry of particles of solid catalytic material into the interior of the collector tube, we have provided a baffle 18, one of which (see Figure 3) is mounted in the interior of the trough upon either side of tube 15, spaced somewhat away from and extending slightly below the orifice 17. In the handling of solid catalytic material in particle form there is always a certain amount of abrasion giving rise to the production of fines. While the velocities of passage of gaseous reactants through the solids are not usually sufficiently great to disturb the bed or to carry normal size particles away from the surfaces where gaseous reactants and solid particles disengage, some particles pass through slots 20 and in falling through the spaces under troughs 16 a portion of them is drifted into the collector tubes 15 by the current of gaseous reactants entering orifices 17. The finer components of this drifted material, of course, may be sufficiently well suspended in the gaseous reactants that it may be carried wholly without the apparatus. However, particles of appreciable size may deposit within subsequent parts of a system where gaseous reactant velocities are lower, with subsequent stoppage of the apparatus. To this end we have provided these baffles 18 which serve to substantially prevent the entry of such particles into the collector tube orifices 17. As may be seen from Figures 4 and 5, these baffles may be either straight or curved in form. They may be secured inside the collector troughs by welding, as shown at 19 in Figure 2. We prefer that the baffles 18 be so placed that there is no space between the upper edge of said baffle and the apex of the collector trough.

We claim:

1. In an apparatus of the kind described, the combination of a perforated conduit and an inverted trough, said trough being attached to the perforated conduit so that the apex of the inverted trough is disposed directly above a perforation in the conduit, slots in the inverted trough, and a baffle disposed inside the inverted trough between the perforation in said conduit and the slots in the inverted trough adjacent the said perforation.

2. In an apparatus of the kind described, the combination of a perforated conduit and an inverted trough, said trough being attached to the perforated conduit so that the apex of the inverted trough is disposed above a perforation in the conduit, and a baffle disposed inside the inverted trough mounted transversely to said trough near the apex thereof, in front of said perforation and spaced away from said perforation.

THOMAS P. SIMPSON.
CHARLES H. LECHTHALER.